(12) United States Patent
Huyzer et al.

(10) Patent No.: US 9,723,810 B2
(45) Date of Patent: Aug. 8, 2017

(54) APPARATUS FOR MIXING AND CUTTING ANIMAL FEED AND METHOD OF OPERATING SUCH AN APPARATUS

(71) Applicant: LELY PATENT N.V., Maassluis (NL)

(72) Inventors: Arie Huyzer, Nieuw Lekkerland (NL); Howard Sie, Rotterdam (NL); Jan Lambertus Pastoor, Rijswijk (NL); Jan Martinus Van Kuilenburg, Wadenoyen (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 14/395,639

(22) PCT Filed: Mar. 14, 2013

(86) PCT No.: PCT/NL2013/050179
§ 371 (c)(1),
(2) Date: Oct. 20, 2014

(87) PCT Pub. No.: WO2013/157932
PCT Pub. Date: Oct. 24, 2013

(65) Prior Publication Data
US 2015/0086687 A1   Mar. 26, 2015

(30) Foreign Application Priority Data

Apr. 20, 2012 (NL) ..................................... 2008672

(51) Int. Cl.
*B02C 25/00* (2006.01)
*A01K 5/00* (2006.01)
*B01F 7/00* (2006.01)
*B01F 7/16* (2006.01)
*B01F 7/24* (2006.01)
*B01F 13/00* (2006.01)
*B01F 15/00* (2006.01)
*A23K 40/00* (2016.01)

(52) U.S. Cl.
CPC .............. *A01K 5/004* (2013.01); *A23K 40/00* (2016.05); *B01F 7/00616* (2013.01);
(Continued)

(58) Field of Classification Search
CPC ........ A01K 5/004; B02C 25/00; A23K 1/001; B01F 7/247; B01F 15/00792;
(Continued)

(56) References Cited

U.S. PATENT DOCUMENTS 4,818,113 A * 4/1989 Patel ...................... B29B 7/005
366/142
5,020,918 A * 6/1991 Faccia .................... A01K 5/004
241/260.1

(Continued)

FOREIGN PATENT DOCUMENTS

EP      0 704 154 A2    4/1996

OTHER PUBLICATIONS

U.S. Appl. No. 14/395,294, filed Oct. 17, 2014, Huyzer, et al.
International Search Report issued Aug. 7, 2013 in PCT/NL2013/050179 filed Mar. 14, 2013.

*Primary Examiner* — Faye Francis
*Assistant Examiner* — Onekki Jolly
(74) *Attorney, Agent, or Firm* — Oblon, McClelland, Maier & Neustadt, L.L.P.

(57) ABSTRACT

An apparatus for mixing and cutting animal feed including a container with a sidewall, a rotary mixing and cutting device positioned inside the container and arranged to be driven by a driving unit. At least one counter element is provided at the sidewall. The apparatus includes a positioning device for moving the counter element between a retracted position and an inserted position, and a control unit to control the positioning device of the counter element and arranged to determine an indication of the amount of instantaneous power consumed by the driving units for driving the rotary mixing and cutting device and to control positioning device based on the determined indication of the amount of instantaneous power.

23 Claims, 3 Drawing Sheets

(52) U.S. Cl.
CPC ............ *B01F 7/1685* (2013.01); *B01F 7/245* (2013.01); *B01F 7/247* (2013.01); *B01F 13/0032* (2013.01); *B01F 15/00792* (2013.01); *B02C 25/00* (2013.01)

(58) Field of Classification Search
CPC .... B01F 7/1685; B01F 7/00616; B01F 7/245; B01F 13/0032
USPC .......... 241/36, 37, 101.74, 101.761, 101.76, 241/101.8, 260.1
See application file for complete search history.

(56) References Cited

U.S. PATENT DOCUMENTS

| | | | | |
|---|---|---|---|---|
| 5,294,064 A | * | 3/1994 | Faccia | A01F 29/005 241/101.6 |
| 5,429,436 A | * | 7/1995 | Stone | A01F 29/005 241/186.4 |
| 5,553,937 A | * | 9/1996 | Faccia | A01F 29/005 241/101.76 |
| 5,553,938 A | | 9/1996 | Faccia | |
| 5,615,839 A | * | 4/1997 | Hartwig | A01F 29/005 241/260.1 |
| 5,803,375 A | * | 9/1998 | Hartwig | A01F 29/005 241/101.761 |
| 5,863,122 A | * | 1/1999 | Tamminga | A01K 5/004 241/101.761 |
| 6,969,191 B2 | * | 11/2005 | Tamminga | A01K 5/004 241/101.761 |
| 6,983,902 B2 | * | 1/2006 | Faccia | A01K 5/004 241/101.761 |
| 7,118,268 B2 | | 10/2006 | Van Der Plas | |
| 2006/0243833 A1 | * | 11/2006 | Nilsson | B02C 1/025 241/30 |

* cited by examiner

APPARATUS FOR MIXING AND CUTTING ANIMAL FEED AND METHOD OF OPERATING SUCH AN APPARATUS

TECHNICAL FIELD

The invention relates to an apparatus for mixing and cutting animal feed comprising a container with a side wall, a rotary mixing and cutting device positioned inside the container, the rotary mixing and cutting device being arranged to be driven by driving means, and at least one counter element provided at the sidewall, wherein the apparatus further comprises at least one positioning device for moving the at least one counter element between a retracted position and an inserted position, the apparatus comprising a control unit to control the positioning device of the at least one counter element. The invention further relates to an assembly of a towing vehicle or prime mover and an apparatus and a method of operating such an apparatus.

PRIOR ART

Containers for mixing and cutting animal feed are known in the prior art.

EP0704154A2 describes a truck for shredding and mixing products for zootechnical use, comprising, on a self-propelled or towed wheeled chassis, a frustum-shaped container that tapers downwardly, is open at the top, and contains a scroll that rotates with a vertical axis and has an external profile that lies on a substantially conical ideal surface, shredding cutters being fitted at the profile. Countercutters, shaped substantially like a circular sector, are pivoted in a vertical arrangement, by means of their respective vertices, to the wall of the container in substantially radial positions and can be inserted and extracted through specifically provided slots. The truck furthermore comprises an automatic actuation and control device for the positioning of the countercutters according to work variables. The actuation and control device is constituted by an electronic control unit that controls means for the movement of the countercutters. This document addresses the problem that agricultural workers do not always dedicate particular attention to the countercutters and often it happens that the worker forgets the cutters in inserted position when they must not be inserted or vice versa. By way of solution, the electronic control unit is connected to load cells for weighing the product. The control unit moves the countercutters according to a program and on the basis of the load detected by the load cells.

U.S. Pat. No. 7,118,268B2 describes a fodder mixing wagon including a fodder mixing container equipped with at least one vertical auger and including an undercarriage having a chassis and ground wheels, which is provided with an active adjusting system for adjusting the fodder distribution within the mixing container. The adjusting system is equipped with at least one sensor arrangement for detecting either the actual fodder weight distribution within and/or the inclination of the mixing container. The adjusting system of the fodder mixing wagon allows to adjust the bottom region of the mixing container relatively precisely horizontally and/or to individually actuate the counter knives depending on the actual inclination of the mixing container or the actual weight distribution, even in the case of an ascending or descending and/or sidewardly sloping ground, in order to achieve an optimum fodder distribution within the mixing container during the mixing process and to prevent that the fodder locally is split outwardly.

BRIEF DESCRIPTION

It is an object to provide an improved container for mixing and cutting animal feed.

According to an aspect there is provided an apparatus for mixing and cutting animal feed comprising a container with a side wall, a rotary mixing and cutting device positioned inside the container, the rotary mixing and cutting device being arranged to be driven by driving means, and at least one counter element provided at the sidewall, wherein the apparatus further comprises at least one positioning device for moving the at least one counter element between a retracted position and an inserted position, the apparatus comprising a control unit to control the positioning device of the at least one counter element, characterized in that the control unit is arranged to determine an indication of the amount of power consumed by the driving means for driving the rotary mixing and cutting device and the control unit is arranged to control at least one positioning device based on the determined indication of the amount of power.

Knowledge about the amount of power consumed by the driving means for driving the rotary mixing and cutting device has the advantage that it provides information about the amount of animal feed present in the container, but also provides information about the amount of cutting actually performed by the rotary mixing and cutting device. Contrary to the prior art devices, it is the actual effect that food has on the mixing and cutting which counts for controlling same. Thereto, arrangements to simply measure an amount of feed not always provide the best results, as feed may have moisture content and thus different densities, toughness and so on. Therefore, amount of feed, let alone simply volume or height of the feed, is less reliable than the indication of power according to the present invention.

The amount of power consumed by the driving means may be determined by measuring an amount of current, torque, revolutions per unit time, noise etc. This may be determined by the control unit, for instance using a suitable sensor or by obtaining information from the driving means or the control of the driving means. Preferably, the current is measured, as this provides not only an easily measured value, but also one that is most relevant to users of electric power, in particular battery power.

By determining the amount of power consumed, an indication is obtained about the efficiency of the mixing and cutting, i.e. whether or not the rotary mixing and cutting device is actually cutting the animal feed (which requires relatively more energy) or is mainly moving the animal feed around in the container (which requires less energy). The power provides a reliable indicator of the efficiency, irrespective of the type of animal food loaded into the container. This may therefore be a good parameter to base the control of the at least one counter element on. For instance, in case the amount of power is relatively low, it can be concluded that cutting is not performed efficiently and one or more of the positioning elements may be controlled to move the associated counter element(s) to the inserted position.

A counter element is an element that can be inserted into the container, and is preferably a plate with a vertical orientation. The counter element may be a counter cutter, comprising a cutting edge, but may also mainly be a mixing element without a cutting edge. The counter element may be provided in, on or through the side wall. The side wall may comprise slots through which the counter element(s) can move. Alternatively or additionally, the counter element may be provided on the side wall and be swivelable or tiltable with respect thereto.

In the inserted position the at least one counter element is positioned closer to the rotary mixing and cutting device than in the retracted position.

According to an embodiment, the apparatus comprises the driving means, the driving means in particular being an electromotor. Alternative driving means such as a combustion engine or the like are also possible.

In case the driving means are part of the apparatus, the amount of available energy is usually limited, making it advantageous to monitor the amount of power which is consumed in order to use the available energy in an efficient way. Alternatively, power is taken from e.g. a towing vehicle with a power take-off, as is known per se in the art, or from example from the mains. In the latter examples, generally more power and energy will be available, although any improved efficiency remains advantageous.

According to an embodiment the apparatus is an autonomous apparatus comprising driving means and energy supply means for the driving means.

The apparatus may function in an autonomous way under control of the control unit. The apparatus may comprise a frame with drive means, such as a number of wheels, the container being provided on the frame, allowing the apparatus to move in an autonomous way. Therefore, the control unit may be arranged to determine navigation instructions and move the apparatus in accordance with the navigation instructions. Such autonomous apparatus are ideally suited to save a lot of labour.

In such a case, the driving means for driving the rotary mixing and cutting device may be a motor comprised by the apparatus. The motor for driving the rotary mixing and cutting device may also be used to drive and steer the apparatus and/or to energize the positioning device. A single motor/engine with one or more transmissions may be simpler than separate motors/engines, although the latter offers the possibility to tailor them to the specific needs of their respective task.

In embodiments, the apparatus comprises a frame with drive means, such as wheels, the container being provided on the frame, there further being provided driving means for driving the drive means (often wheels) and the rotary mixing and cutting device, as well as an energy supply for providing energy to the driving means and the at least one positioning device. In particular, the apparatus is an autonomous apparatus. For these embodiments, it is particularly advantageous to have the counter elements according to the present invention, as the most efficient use of energy is very desirable in autonomous apparatus with an on-board energy supply.

For these embodiments, it is particularly advantageous to control the counter elements according to the present invention, as the most efficient use of energy is very desirable in autonomous apparatus with an on-board energy supply. The control unit may be arranged to determine navigation instructions and move the apparatus in accordance with the navigation instructions.

The driving means may be an electromotor, the energy supply means may be formed by a battery or the like.

The apparatus may further comprise an connection member arranged to be coupled to an external corresponding connection member for recharging the energy supply means. The connection members may be electrical connection members. The control unit may be arranged to perform cutting only or mainly when being connected to the external connection member, as in such a situation often more energy and/or power will be available.

According to an embodiment the apparatus comprises a coupling member arranged to be coupled to external driving means, the driving means being arranged to drive the rotary mixing and cutting device via the coupling member, such as a power take-off of a towing vehicle/tractor. In such embodiments, the use of power/energy is often less of a concern, and bigger and high-power apparatus, often under human control or supervision, may be provided.

The apparatus may be an autonomous apparatus and may also comprise a number of wheels, caterpillar tracks or the like, allowing the apparatus to move in an autonomous way. The apparatus may also comprise a coupling member for connecting the apparatus to a docking station, the docking station comprising the driving means.

According to an alternative, the apparatus may comprise wheels and a coupling member, allowing the apparatus to be coupled to a towing vehicle, wherein the driving means are part of the towing vehicle and the coupling between the apparatus and the towing vehicle is arranged for transferring energy from the driving means to the rotary mixing and cutting device. The means for transferring may be an electrical connection or may be a driving shaft. The coupling member may be arranged to be coupled to the power take-off of a towing vehicle.

According to the invention, at least one counter element is controlled on the basis of a measured indication of power. In an embodiment, the control unit is arranged to position at least one counter element in the retracted position when the indication of the amount of power is above a predetermined first threshold.

The control unit may for instance be arranged to position a number of the at least one counter elements in the retracted position. The number of counter elements may for instance depend on the amount of power measured. For example, when the measured power is below a first threshold, two or more, or all, counter elements may be moved into the inserted position. When the measured power is above a first threshold but below a second threshold, one counter element of the inserted counter elements may be moved into the retracted position, and when the measured power is above the second threshold, one or more, or all, additional, and originally inserted, counter elements may be moved into the retracted position. Any other desired scheme is also possible.

The amount of power consumed by the driving means is a good indication of the amount of animal feed present in the container and of the rate at which cutting takes place. If there is enough animal feed present, there is less need to position counter elements in the inserted position.

When the consumed power is above the predetermined first threshold the positioning device can be controlled to position at least one counter element in the retracted position. In case the counter element was already in the retracted position for some reason, the positioning device is controlled to keep the counter element in the retracted position. In case the counter element was in the inserted position, the positioning device is controlled to move the counter element from the inserted position to the retracted position and keep it in the retracted position.

According to an embodiment the control unit is arranged to position at least one counter element in the inserted position when the indication of the amount of power is below a predetermined second threshold.

The control unit may for instance be arranged to position a number of the at least one counter elements in the inserted position. The number of counter elements may for instance depend on the amount of power measured.

The amount of power consumed by the driving means is a good indication of the amount of animal feed present in the container and of the rate at which cutting takes place. If there is not enough animal feed present, there is more need to position counter elements in the inserted position.

When the consumed power is below the predetermined second threshold the positioning device can be controlled to position at least one counter element in the inserted position. In case the counter element was already in the inserted position for some reason, the positioning device is controlled to keep the counter element in the inserted position. In case the counter element was in the retracted position, the positioning device is controlled to move the counter element from the retracted position to the inserted position and keep it in the inserted position.

As a result of applying the first and second thresholds (which may be the same), the counter element may move back and forth between the loading process when the amount of power needed fluctuates around the thresholds. The amount of power may for instance increase when an additional portion of animal feed is loaded into the container and may decrease while cutting progresses, and may increase again when a next portion of animal feed is loaded.

The first and second thresholds may be equal or the second threshold may be lower than the first threshold to prevent uncontrolled back and forth movements of counter cutters due to noise or small variations in the power. Also, the indication of the amount of power may be determined using a running average method and/or a filtering may be applied to provide a reliable indication of the power, which is not subject to random fluctuations.

According to an embodiment the control unit is arranged to control at least one positioning device for bringing at least one counter element in a pulsating modus, wherein the at least one counter element moves between the retracted and inserted position.

Operating at least one counter element in a pulsating modus is an advantageous way to improve the performance of the apparatus. The pulsating modus may comprise a single back and forth movement, for instance during loading of the container in case a sudden increase or decrease of the amount of power is detected. For instance, during loading of the container the counter elements may be in the retracted position. When a relatively sudden decrease of the amount of power is detected this may indicate that the animal feed is no longer within reach of the mixing and cutting device. The control unit may react to this by controlling one or more positioning devices to position corresponding counter elements in the inserted position during a predetermined time interval. Also, when during an after-loading phase a sudden change in the amount of power is detected, the control unit may react to this by temporarily changing the position of at least one counter cutter during a predetermined time interval.

Alternatively or additionally the pulsating modus may comprise a plurality of back and forth movements, for instance during an after-loading phase in which the animal feed is further mixed and cut. The pulsating modus may be initiated to find an optimal balance between guiding the animal feed towards the mixing and cutting device while at the same time piling up of the animal feed is prevented or pile-up of animal feed that already occurred can be freed.

One or more counter cutters may be provided, of which a sub-set may be controlled in the pulsating modus, the sub-set may also comprising all the counter cutters. The counter cutters may be controlled independently from each other, i.e. some counter cutters may be in the pulsating modus, while other counter cutters are not in the pulsating modus.

According to an embodiment the control unit is arranged to control, in particular initiate or stop, the pulsating modus based on the determined indication of the amount of power, in particular initiating the pulsating modus when the determined indication of the amount of power is above a pulsating modus threshold.

Controlling the pulsating modus may comprise controlling the start and/or end of the pulsating modus, controlling the time intervals between the back and forth movements between the retracted and inserted position, and so on.

The control unit may use suitable sensors to determine the indication of the amount of power consumed by the rotary mixing and cutting device.

The pulsating modus may for instance be initiated when the determined indication of the amount of power is above a pulsating modus threshold, indicating that there is enough animal feed present in the container and/or enough mixing and cutting is performed, to initiate the pulsating modus. The pulsating modus may be ended when the indication of the amount of power becomes below the pulsating modus threshold or below a further predetermined threshold, being smaller than the pulsating modus threshold.

This provides the advantage that the apparatus can function autonomously, i.e. no direct user interaction is required to control the pulsating modus. By determining the indication of the amount of power information is gathered about the functioning of the apparatus, based on which the control unit may decide to start and/or end the pulsating modus. Such an apparatus has the advantage that the cutting and mixing is controlled in an automatic and reliable way, which no longer requires the constant attention of personnel to watch if the container is functioning in an efficient way and if no animal feed is clustered against side walls of the container out of reach of the rotary mixing and cutting device.

According to an embodiment the control unit is arranged to have the at least one counter element move between the retracted and inserted position at predetermined time intervals during the pulsating modus.

By applying predetermined time intervals, no measurements are needed during the pulsating modus. The at least one counter element can be moved back and forth according to a predetermined time scheme.

The predetermined time intervals may be settings which can be set and changed by a user. The time intervals may be constant or may vary during the pulsating modus as the mixing and cutting progresses. The time intervals may be chosen such that the at least one counter element is in the retracted position during a first amount of time (for instance 5 or 10 s) and in the inserted position during a second amount of time (for instance 30 or 60 s), wherein the first and second amount of time may be different or the same.

According to an example the first amount of time may be much shorter, for instance at least 5 times shorter, than the second amount of time. This is advantageous in case the container is relatively full. In such a case the counter element will often not be positioned in the inserted position constantly although this may be required to guide the animal feed towards the mixing and cutting device to ensure efficient mixing and cutting and to prevent formation of a "doughnut" along the side wall, as in the inserted position piling up of animal feed may occur. According to the example provided the counter element may be in the pulsating modus in which the counter element is in the inserted position during most of the time, but piling up is prevented by positioning the counter element in the retracted position during relatively short periods of time.

In case the pulsating modus comprises a single back and forth movement, the time interval between the back and forth movement can be a setting which can be set and changed by a user or may depend on a working parameter of the apparatus, examples of which will be provided below.

Alternatively, the time intervals may also be automatically adjusted by the control unit based on a determined operational parameter. Examples of operational parameters will be provided below.

According to an embodiment the control unit is arranged to have the at least one counter element move repeatedly between the retracted and inserted position during the pulsating modus.

By repeatedly positioning the counter element in the inserted and retracted position, the animal feed can be pushed towards the mixing and cutting device without the need to continuously position the counter element in the inserted position, which would increase the resistance of the mixing and cutting device and introduces the risk of animal feed piling up against the counter element. The repeated movements may be performed at predetermined constant time intervals.

The different thresholds described may be preset, but may also be adjustable by a user. The control unit may comprise user interface means, such as a keyboard and a display, allowing a user to define and change settings, such as the predetermined thresholds. The user interface means may also be formed by a remote computer, arranged to communicate with the control unit.

According to an embodiment the apparatus comprises a sensor for determining the indication of the amount of power consumed by the driving means for driving the rotary mixing and cutting device, for instance be measuring one or more of the following: current provided to the driving means, revolutions of the driving means per unit time, torque.

A sensor can be used to measure the indication of the amount of power consumed by the driving means for driving the rotary mixing and cutting device. Such a sensor is advantageously a current sensor, providing through in particular a current value a clear indication of the power. Other types of sensor are not excluded, such as power sensors, or rpm counters, or combinations thereof.

According to an aspect there is provided an assembly of a towing vehicle or prime mover and an apparatus as described above.

The towing vehicle and the apparatus may be coupled using appropriate coupling members. The coupling may comprise means for transferring energy from a motor provided on the towing vehicle for driving the towing vehicle to energize the rotary mixing and coupling device. The means for transferring energy from the motor to the rotary mixing and cutting device may be electrical means or mechanical means, such as a driving shaft or the power take-off.

The apparatus comprises drive means, such as wheels, and is operatively coupled to a towing vehicle or prime mover. The control unit and/or the sensor(s) as described above may be provided on the apparatus or on the towing vehicle or prime mover.

The coupling may also be a towing coupling and the driving means for driving the mixing and cutting device may be comprised by the apparatus.

According to a further aspect there is provided a method of operating an apparatus for mixing and cutting animal feed, the apparatus comprising a container with a side wall, a rotary mixing and cutting device positioned inside the container, the rotary mixing and cutting device being arranged to be driven by driving means and at least one counter element provided at the sidewall, wherein the apparatus further comprises at least one positioning device for moving the at least one counter element between a retracted position and an inserted position, the method comprising:
a) loading animal feed into the container,
b) rotating the rotary mixing and cutting device,
c) controlling the position of the at least one counter element to be in the retracted position or in the inserted position, characterized by the action c) further comprises determining an indication of the amount of power consumed by the driving means for driving the rotary mixing and cutting device and controlling the position of at least one counter element based on the determined indication of the amount of power.

According to an embodiment the method further comprises d) unloading the container.

According to an embodiment the method further comprises moving the apparatus in accordance with navigation instructions to position the apparatus at a loading position at least during action a) and moving the apparatus to an unloading position or along an unloading path during action d).

According to an embodiment action c) comprises positioning at least one counter element in the retracted position when the indication of the amount of power is above a predetermined first threshold.

According to an embodiment action c) comprises positioning at least one counter element in the inserted position when the indication of the amount of power is below a predetermined second threshold.

According to an embodiment action c) comprises controlling at least one positioning device for bringing at least one counter element in a pulsating modus, wherein the at least one counter element moves between the retracted and inserted position.

According to an embodiment action c) comprises controlling, in particular initiate or stop, the pulsating modus based on the determined indication of the amount of power, in particular initiating the pulsating modus when the determined indication of the amount of power is above a pulsating modus threshold.

According to an embodiment action c) comprises controlling the at least one counter element to move between the retracted and inserted position at predetermined time intervals during the pulsating modus.

According to an embodiment action c) comprises controlling the at least one counter element to move repeatedly between the retracted and inserted position during the pulsating modus.

According to an embodiment action c) comprises receiving a measurement from a sensor for determining the indication of the amount of power consumed by the driving means for driving the rotary mixing and cutting device, the measurement value being an indication of one or more of the following: current provided to the driving means, revolutions of the driving means per unit time, torque.

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

Embodiments will be described with reference to the Figures.

Figure 1:
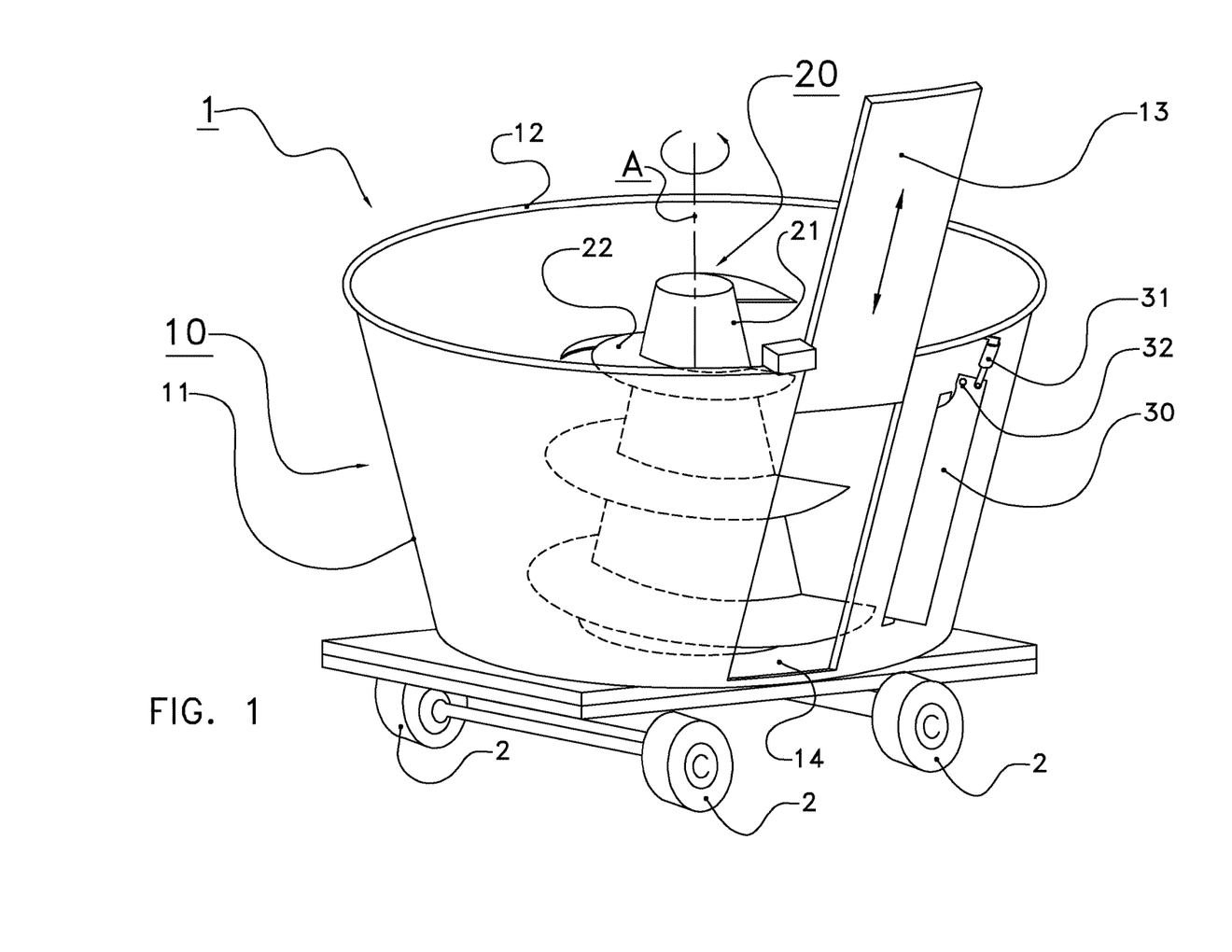
FIG. 1 schematically depicts a perspective view of an embodiment.
Figure 2:
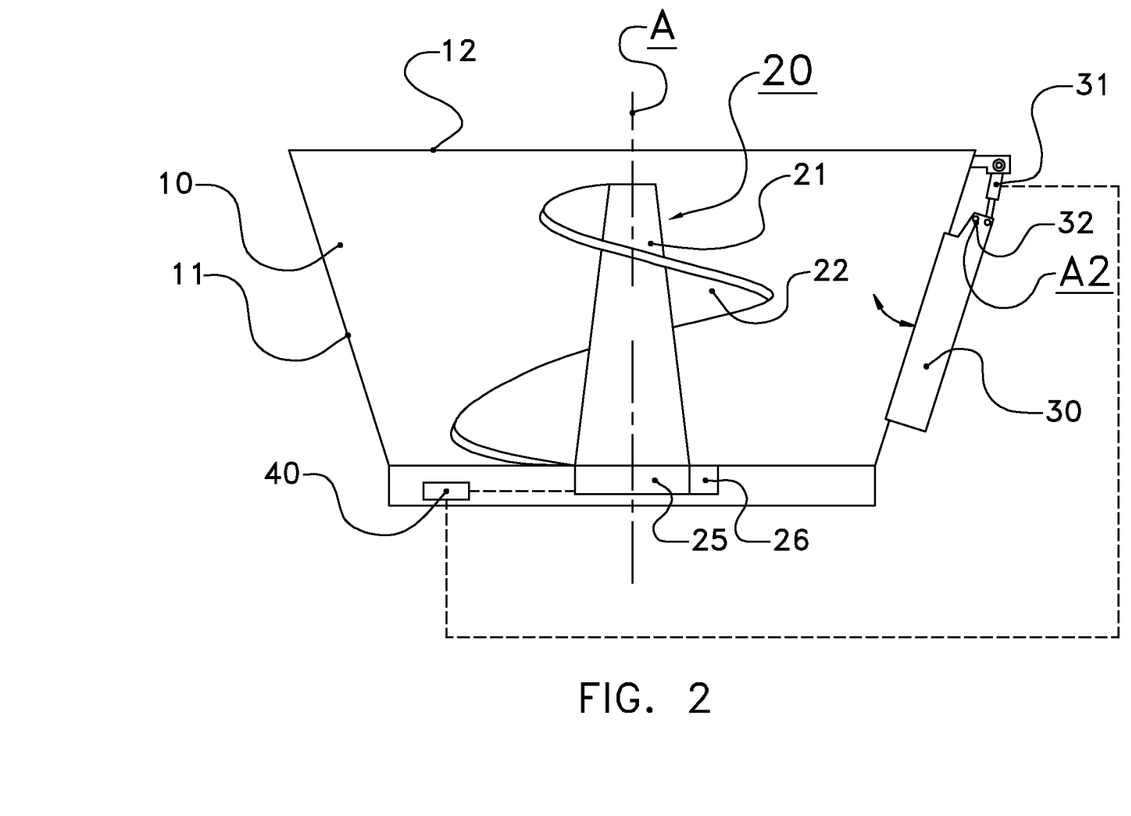
FIG. 2 schematically depict a cross sectional view according to an embodiments, and FIG. 3 schematically depicts a cross sectional views according to a further embodiment.

FIG. 1 shows an embodiment of an apparatus 1 for mixing and cutting animal feed comprising a container 10 and a rotary mixing and cutting device 20 positioned inside the container 10 and one counter element 30 provided at a sidewall 11 of the container 10. It will be understood that any number of counter element 30 may be provided. FIG. 2 shows a cross sectional view of the apparatus 1. The apparatus 1 further comprises a control unit 40. The control unit 40 may also be positioned at a remote position, but may be functionally be part of the apparatus 1.

The apparatus 1 comprises a plurality of wheels 2, one or more of the wheels 2 may be steered and/or wheels may be driven separately. The wheels 2 may be controlled by the control unit 40.

The container 10 has a sidewall 11. The shape of the side wall 11 may be such that mixing, cutting and unloading can be done efficiently. The sidewall 11 may taper in a downward direction. The side wall 11 may have a substantial circular circumference, or preferably an upper edge 12 that deviates from a circle, such as a circle stretched in one direction, having two opposite portions with a smaller radius and two opposite portions with a larger radius.

The side wall 11 further comprises a moveable wall element 13 which can move to create an opening 14 through which the animal feed can be unloaded. The moveable wall element 13 may also be controlled by the control unit 40.

The counter element 30 is preferably positioned at a portion with a smaller radius or at a transition from a smaller radius to a larger radius, taking into account the rotary direction of the rotary mixing and cutting device 20. The counter element 30 is preferably positioned just downstream of the opening 14. The downstream direction is the direction in which the animal feed is rotated by the rotary mixing and cutting device 20.

The rotary mixing and cutting device 20 comprises a central cylindrical shaft 21 with a radial extending member 22, such as a blade, attached to it. The rotary mixing and cutting device 22 is arranged to rotate about a rotary axis A. In the embodiment shown, the rotary mixing and cutting device 20 rotates in a counter clockwise direction when seen from above.

The apparatus further comprises driving means, such as a motor 25 for driving the rotary mixing and cutting device 20. In the embodiment shown in FIG. 2, the motor 25 is controlled by the control unit 40. The motor 25 may be an electrical motor 25, which is advantageous in case the apparatus is an autonomous apparatus 1 which is arranged to navigate and move autonomously. The apparatus 1 may further comprise energy supply means 26, such as a battery or the like. Alternatively or in addition, the apparatus 1 may comprise a coupling member for coupling to external energy supply means such as the mains to recharge the energy supply means 26 or to power the rotary mixing and cutting device 20 directly.

Alternatively, the apparatus 1 comprises a coupling for coupling the apparatus to driving means, such as a motor. The apparatus 1 may for instance be arranged to be coupled to a towing vehicle 70 (see FIG. 3), where the rotary mixing and cutting device 1 can be driven via the coupling, for instance by a driving shaft or the power take-off of the towing vehicle 70.

The blade 22 may be a helical blade surrounding the central cylindrical shaft 21, forming an Archimedes screw. The radial dimension of the helical blade 22 may decrease in upward direction. The central cylindrical shaft 21 may be tapered in the upward direction.

The mixing and cutting device 20, in particular an Archimedes screw, is arranged to transport the animal feed in the upward direction, where the animal feed at some point drops down from the blade 22. This up and down movement of the feed mixes the feed.

The edge of the blade 22 may be arranged to cut the animal feed. Additional cutting members may be provided to cut the animal feed more effectively.

It will be understood that more than one rotary mixing and cutting device 20 may be provided inside the container 10. Also, the rotary mixing and cutting device may have a different orientation, for instance the rotary axis may be at an angle of 0°-45° with respect to the vertical.

Figure 3:
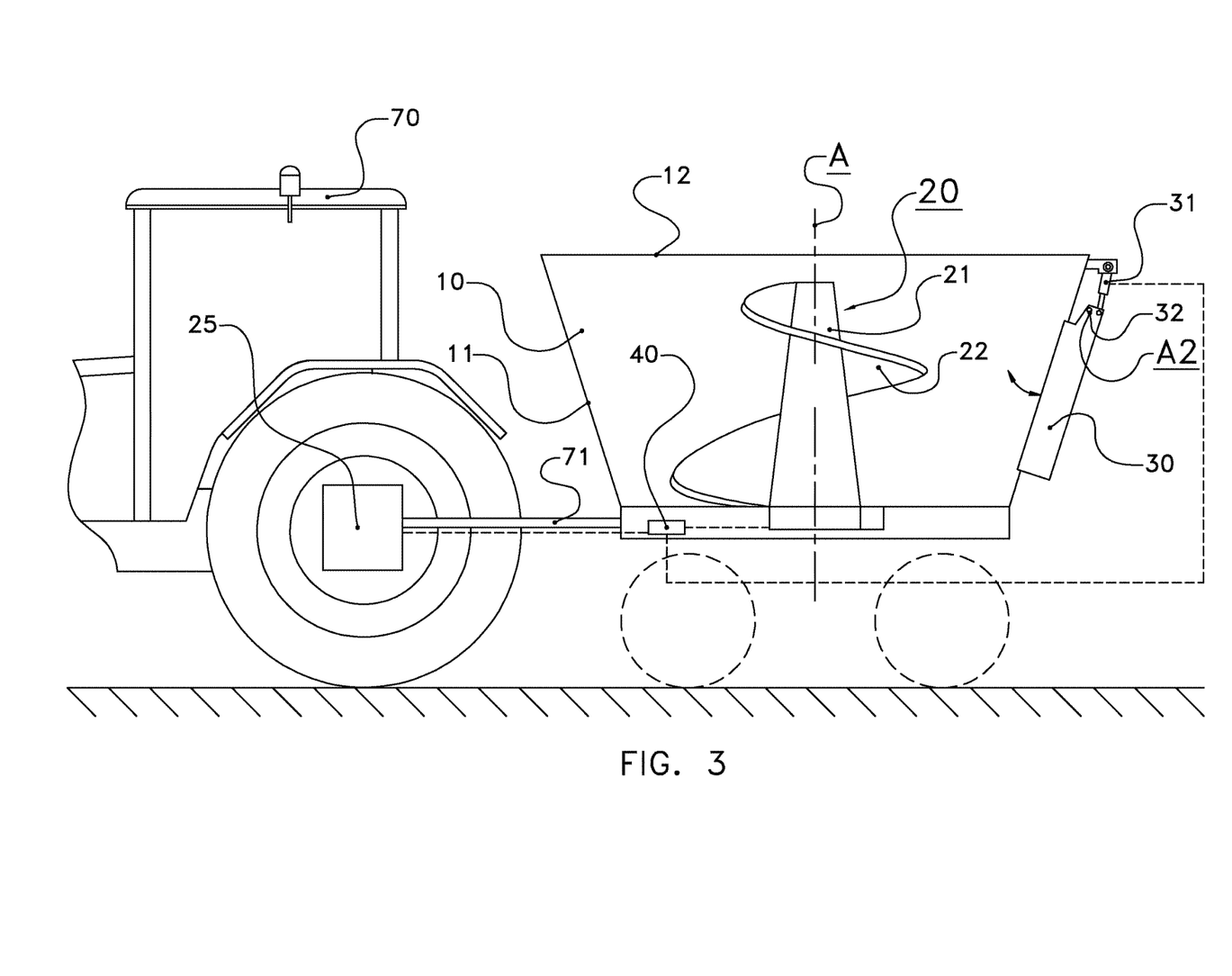

The counter element 30 is moveable between a retracted position and an inserted position, controlled by the control unit 40, as indicated by the double arrow in FIGS. 2 and 3.

The sidewall 11 of the container 10 comprises an opening or slot 12 to allow the counter element 30 to move between the retracted and inserted position. The counter element 30 is mounted by a rotary connection 32 allowing the counter element 30 to rotate about an axis of rotation A2 which is substantially tangential to the side wall 11 and perpendicular to the rotary axis A of the rotary mixing and cutting device 20, thereby allowing the counter element 30 to move in a substantial radial direction with respect to the rotary axis A of the rotary mixing and cutting device 20. It will be understood that the counter element 30 may be positioned in any other suitable direction, for instance pointing in a downstream direction with respect to the rotary direction of the rotary mixing and cutting device 20.

In the inserted position, the counter element 30 is positioned closer to the rotary mixing and cutting device 20 than in the retracted position. In the retracted position, the counter element 30 may be completely outside the container 10.

Alternative embodiments are conceivable, such as an embodiment in which no slots 12 or the like are provided in the side wall 11, but wherein the counter element 30 is positioned parallel to the side wall 11 in the retracted position and is connected to the side wall 11 via a rotary connection allowing to rotate the counter element 30 to an inserted position in which the counter element 30 is rotated towards the rotary mixing and cutting device 20.

A positioning device 31 may be provided to move the counter element 30 between the inserted and retracted position, the positioning device 31 being controlled by the control unit 40. The positioning device 31 may be an actuator, such as an hydraulic actuator. The control unit 40 is arranged to control the positioning device 31, allowing the counter element 30 to move back and forth between the retracted and inserted position.

In the pulsating modus, the back and forth movements are performed at predetermined time intervals. The back and forth movement may be performed once or may be performed repeatedly. The control unit 40 comprises or has access to a clock or timer for timing the back and forth movements at the predetermined time intervals.

The control unit 40 may comprise a processor and a memory, wherein the memory comprises programming lines which are readable and executable by the processor to provide the control unit 40 with the functionality in accordance with the embodiments. The control unit 40 may comprise an input/output unit allowing the control unit to send instructions and receive information from other hardware parts of the apparatus, such as the wheels 2, sensors, the motor 25, the positioning device 31 etc. The ability to communicate is indicated in the Figures by dotted lines. This communication may be wired or wireless communication.

The control unit 40 may also comprise user interface means, such as a keyboard and a display, allowing a user to define settings, such as the predetermined time intervals. The user interface means may also be formed by a remote computer, arranged to communicate with the control unit 40.

The apparatus 1 may be arranged to determine an indication of the amount of power consumed by the driving means 25 to drive the rotary mixing and cutting device 20, which can be used by the control unit 40 to control the positioning device 31 to be positioned in the inserted position or in the retracted position or, possibly, to be in the pulsating modus.

For the pulsating modus it is noted that the indication of the amount of power may in particular be used to initiate or stop the pulsating modus and/or to determine the characteristics of the pulsating modus, such as the time intervals between the back and forth movements.

The apparatus 1 may comprise one or more sensors to determine the amount of power consumed by the driving means 25.

FIG. 3 shows an alternative embodiment, showing an assembly of an apparatus 1 and a towing vehicle 70. According to this embodiment, the apparatus 1 comprises a coupling member 71 for connecting the apparatus 1 to a towing vehicle 70 or prime mover, wherein the motor 25 is part of the towing vehicle 70 and the coupling member 71 may comprise means for transferring energy from the motor 25 to the rotary mixing and cutting device 20. The means for transferring may be an electrical connection or may be a driving shaft.

Alternatively, the driving means 25 for driving the rotary mixing and cutting device 20 may be comprised by the apparatus, the coupling member 71 being only a towing connection.

In both embodiments (FIGS. 2 and 3), the control unit 40 may be arranged to determined an indication of a working parameter of the motor, in particular an indication of the amount of power consumed by the motor 25.

The apparatus may be an autonomous apparatus 1 (FIG. 2), which can navigate and move autonomously. In that case, the apparatus 1 can be provided with an electrical motor as driving means 25. The amount of power consumed by the motor may be determined by measuring electrical characteristics of the motor, such as measuring electrical current and or voltage consumed by the motor.

The control unit 40 may also be arranged to receive an indication of the type or types of animal feed loaded in the container 10, wherein the control unit 40 is arranged to control the at least one counter element 30 also based on the indication of the type or types of animal feed. For instance, the decision to move one or more counter cutters 30 to the inserted or retracted position or to initiate the pulsating modus may depend on the type or types of animal feed inside the container. Also, the predetermined time intervals applied in the pulsating modus may depend on the type or types of animal feed.

The functioning of the apparatus will now be described in more detail.

First, animal feed is loaded into the container 10. This may be done by an employee or in an automated way. This is referred to as action a).

During loading (action a), the rotary mixing and cutting device 20 can be rotated, although this may also be started after loading is completed or halfway during loading. Rotating the rotary mixing and cutting device 20 is referred to as action b). Next, the position of the at least one counter element (30) is controlled to be in the retracted position or in the inserted position in action c). This may be done during action b) or only during part of action b).

The phase during which action a) is performed is referred to as the loading phase. The phase after action a) is completed is referred to as the after-loading phase. During the after-loading phase, rotating the rotary mixing and cutting device 20 may continue, the apparatus may move to a different location and unloading of the apparatus 1 via opening 14 may take place. Rotating, moving and unloading may be performed simultaneously.

During action c) the counter element 30 can be controlled based on the determined indication of the amount of power consumed by the rotary mixing and cutting device 20.

The control unit 40 may be arranged to position one or more counter elements 30 in the retracted or inserted position by comparing the indication of the amount of power with predetermined threshold values. Also, the pulsating modus may be initiated or ended by comparing the indication of the amount of power with predetermined threshold values. Also, the time intervals applied to move the counter elements back and forth during the pulsating modus may be chosen based on the determined indication of the amount of power.

The time intervals may be chosen such that the counter element is in the inserted position for most of the time and is in the retracted position for a relatively small amount of the time, to allow piled up animal feed to be released.

Thus, the control unit 40 may determine an indication of a working parameter of the motor 25, in particular an indication of the amount of power consumed by the motor 25 during action c) and control the counter element 30 based on that. For instance, the counter element 30 may be controlled to be in the inserted position when the power is below a predetermined threshold value and may be brought in the pulsating modus when the power is above a predetermined threshold value.

The predetermined time intervals and threshold values may be pre-programmed and may be adjustable by a user via a suitable user interface. Also, the time intervals and threshold may depend on the type or types of animal feed loaded in the container 10.

According to a further embodiment, the method further comprises action d) unloading the container 10. Unloading may be done by moving the moveable wall element 13 creating an opening 14.

The method may further comprise computing navigation instructions and moving the apparatus in accordance with the navigation instructions to position the apparatus at a loading position during action a) and moving the apparatus to an unloading position or along an unloading path during action d). Actions b) and c) may be performed during actions a) and d) and during movement of the apparatus, in particular from the loading position to the unloading position or unloading path.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An apparatus for mixing and cutting animal feed comprising:
   a container with a sidewall;
   a rotary mixing and cutting device positioned inside the container, the rotary mixing and cutting device being arranged to be driven by a motor;
   at least one counter element provided at the sidewall;
   at least one positioning device that moves the at least one counter element between a retracted position and an inserted position; and
   control circuitry configured to control the positioning device of the at least one counter element,
   wherein the control circuitry is further configured to
   determine an indication of the amount of power consumed by the motor that drives the rotary mixing and cutting device, and
   control at least one positioning device to move the at least one counter element based on the determined indication of the amount of power consumed by the motor.

2. The apparatus according to claim 1, wherein the motor is an electromotor.

3. The apparatus according to claim 2, wherein the apparatus is autonomous and further includes an energy supply device for the motor.

4. The apparatus according to claim 1, further comprising:
   a coupling member coupled to an external motor, the motor driving the rotary mixing and cutting device via the coupling member.

5. The apparatus according to claim 1, wherein the control circuitry is further configured to instruct positioning of at least one counter element in the retracted position when the indication of the amount of power is above a predetermined first threshold.

6. The apparatus according to claim 1, wherein the control circuitry is further configured to instruct positioning of at least one counter element in the inserted position when the indication of the amount of power is below a predetermined second threshold.

7. The apparatus according to claim 1, wherein the control circuitry is further configured to control at least one positioning device for bringing at least one counter element in a pulsating modus, wherein the at least one counter element moves between the retracted and inserted position.

8. The apparatus according to claim 7, wherein the control circuitry is further configured to control, including initiating or stopping, the pulsating modus based on the determined indication of the amount of power, the initiating the pulsating modus being controlled to be performed when the determined indication of the amount of power is above a pulsating modus threshold.

9. The apparatus according to claim 7, wherein the control circuitry is further configured to have the at least one counter element move between the retracted and inserted position at predetermined time intervals during the pulsating modus.

10. The apparatus according to claim 7, wherein the control circuitry is further configured to have the at least one counter element move repeatedly between the retracted and inserted position during the pulsating modus.

11. The apparatus according to claim 1, further comprising
   a sensor that determines the indication of the amount of power consumed by the motor when driving the rotary mixing and cutting device, the sensor measuring one or more of the following: current provided to the motor, revolutions of the motor per unit time, torque.

12. An assembly of a towing vehicle or prime mover and the apparatus according to claim 1.

13. The apparatus according to claim 1, wherein the control circuitry is further configured to control the at least one positioning device to move the at least one counter element to modify a future amount of power consumed by the motor based on the determined indication of the amount of power consumed by the motor.

14. A method of operating an apparatus for mixing and cutting animal feed, the method comprising:
   providing the apparatus including a container with a sidewall, a rotary mixing and cutting device positioned inside the container, the rotary mixing and cutting device being arranged to be driven by a motor and at least one counter element provided at the sidewall, and at least one positioning device for moving the at least one counter element between a retracted position and an inserted position,
   loading animal feed into the container;
   rotating the rotary mixing and cutting device;
   controlling the position of the at least one counter element to be in the retracted position or in the inserted position,
   determining an indication of the amount of instantaneous power consumed by the motor when driving the rotary mixing and cutting device, and
   controlling the position of at least one counter element to move the at least one counter element based on the determined indication of the amount of power consumed by the motor.

15. The method according to claim 14, further comprising:
   unloading the container.

16. The method according to claim 15, further comprising:
   moving the apparatus in accordance with navigation instructions to position the apparatus at a loading position at least during the loading and moving the apparatus to an unloading position or along an unloading path during the unloading.

17. The method according to claim 14, wherein the controlling further comprises positioning at least one counter element in the retracted position when the indication of the amount of power is above a predetermined first threshold.

18. The method according to claim 14, wherein the controlling further comprises positioning at least one counter element in the inserted position when the indication of the amount of power is below a predetermined second threshold.

19. The method according to claim 14, wherein the controlling further comprises controlling at least one positioning device for bringing at least one counter element in a pulsating modus, wherein the at least one counter element moves between the retracted and inserted position.

20. The method according to claim 19, wherein the controlling further comprises controlling, including initiating or stopping, the pulsating modus based on the determined indication of the amount of power, the initiating the pulsating modus being controlled to be performed when the determined indication of the amount of power is above a pulsating modus threshold.

21. The method according to claim 19, wherein the controlling further comprises controlling the at least one counter element to move between the retracted and inserted position at predetermined time intervals during the pulsating modus.

22. The method according to claim 19, wherein the controlling further comprises controlling the at least one counter element to move repeatedly between the retracted and inserted position during the pulsating modus.

23. The method according to claim 14, wherein the controlling further comprises receiving a measurement value from a sensor determining the indication of the amount of power consumed by the motor driving the rotary mixing and cutting device, the measurement value being an indication of one or more of the following: current provided to the motor, revolutions of the motor per unit time, torque.

* * * * *